(12) United States Patent
Kawata

(10) Patent No.: US 9,097,223 B2
(45) Date of Patent: Aug. 4, 2015

(54) AIR CLEANER STRUCTURE OF MOTORCYCLE

(71) Applicant: SUZUKI MOTOR CORPORATION, Hamamatsu-shi, Shizuoka (JP)

(72) Inventor: Koichiro Kawata, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 0 days.

(21) Appl. No.: 14/297,151

(22) Filed: Jun. 5, 2014

(65) Prior Publication Data

US 2014/0360795 A1    Dec. 11, 2014

(30) Foreign Application Priority Data

Jun. 6, 2013   (JP) .................................. 2013-119846

(51) Int. Cl.
*B61K 13/02* (2006.01)
*F02M 35/16* (2006.01)
*B60K 13/02* (2006.01)
*F02M 35/02* (2006.01)

(52) U.S. Cl.
CPC .............. *F02M 35/162* (2013.01); *B60K 13/02* (2013.01); *F02M 35/02* (2013.01); *F02M 35/0201* (2013.01)

(58) Field of Classification Search
USPC .................................. 180/219, 291, 292, 68.1
See application file for complete search history.

(56) References Cited

U.S. PATENT DOCUMENTS

| | | | | |
|---|---|---|---|---|
| 4,666,009 | A * | 5/1987 | Yashima et al. | 180/68.5 |
| 4,796,719 | A * | 1/1989 | Shiratsuchi | 180/219 |
| 5,609,658 | A * | 3/1997 | Takemura et al. | 55/385.3 |
| 5,908,079 | A * | 6/1999 | Amino | 180/219 |
| 6,283,242 | B1 * | 9/2001 | Umeoka et al. | 180/219 |
| 7,314,107 | B2 * | 1/2008 | Nakagome et al. | 180/68.3 |
| 7,353,899 | B2 * | 4/2008 | Abe et al. | 180/68.3 |
| 7,942,226 | B2 * | 5/2011 | Nishizawa et al. | 180/219 |
| 8,146,693 | B2 * | 4/2012 | Oohashi et al. | 180/68.3 |

FOREIGN PATENT DOCUMENTS

JP    2007-076553    3/2007

* cited by examiner

*Primary Examiner* — J. Allen Shriver, II
*Assistant Examiner* — Bridget Avery
(74) *Attorney, Agent, or Firm* — Troutman Sanders LLP

(57) ABSTRACT

A part of an air cleaner main body overlapped with vehicle body frames in a side view has a shape in which an upper surface portion of the part is narrower than a bottom surface portion of the part. The air cleaner main body is formed to have approximately uniform gaps along inner surfaces of the vehicle body frames, and the air cleaner main body is inserted from a position below the vehicle body frames and is fixed to the vehicle body frames before mounting an engine.

8 Claims, 8 Drawing Sheets

AIR CLEANER STRUCTURE OF MOTORCYCLE

CROSS-REFERENCE TO RELATED APPLICATION

This application is based upon and claims the benefit of priority of the prior Japanese Patent Application No. 2013-119846, filed on Jun. 6, 2013, the entire contents of which are incorporated herein by reference.

BACKGROUND OF THE INVENTION

1. Field of the Invention

The present invention typically relates to, in a motorcycle in which an engine is mounted on vehicle body frames extended diagonally rear downward from a steering head pipe, a structure of an air cleaner disposed above the engine.

2. Description of the Related Art

Generally, as a method of improving aerodynamic characteristics (Coefficient of Drag CD×frontal projected area A) of a vehicle such as a motorcycle, it is effective to narrow a width of vehicle body frames to make elbows and knees of a passenger or a rider to be positioned inwardly. Particularly, in a vehicle in which an engine with wide width in right and left directions such as a parallel multicylinder engine is mounted, a width of vehicle body frames is increased, if no measure is taken. Especially in a case where it is structured such that an air cleaner mounted above an engine is detached/attached from a position above vehicle body frames, an opening of an upper part of the vehicle body frames is required to have a size equal to or larger than a size of the air cleaner, resulting in that a width is increased. Accordingly, since it is not possible to make elbows and knees of a rider to be positioned toward the inside of the vehicle, a frontal projected area is increased, and an aerodynamic performance is lowered. Further, since a degree of freedom when a rider rides the vehicle is also lowered, a degree of fatigue at a time of driving for a long period of time becomes large.

For example, in a motorcycle disclosed in Patent Document 1, a technique for improving an aerodynamic performance and enlarging a degree of freedom when a rider rides the motorcycle is disclosed. In this example, a width of vehicle body frames is reduced by adopting a monocoque frame integrated with an air cleaner box.

[Patent Document 1] Japanese Laid-open Patent Publication No. 2007-76553.

The monocoque frame such as one in Patent Document 1 is a unit effective for manufacturing a compact vehicle, but, it has a structure with which a control of rigidity of the vehicle body frames is difficult. Meanwhile, in a vehicle required to have a high-speed performance such as a racer, a conventional twin spar frame excellent in high rigidity is the most suitable. However, when a parallel multicylinder engine is mounted on the twin spar frame, practically it cannot be said that a structure in which an air cleaner is attached/detached from a position above the vehicle body frames is suitable for aerodynamic characteristics and the like, if no measure is taken.

SUMMARY OF THE INVENTION

The present invention is made in view of such circumstances, and an object thereof is to provide an air cleaner structure of a motorcycle exhibiting an excellent effect regarding an improvement of both of aerodynamic characteristics and a degree of freedom at a time of riding.

An air cleaner structure of a motorcycle of the present invention is characterized in that it has, in the motorcycle in which on engine is mounted on vehicle body frames extended diagonally rear downward from a steering head pipe, throttle bodies are disposed in a vertical posture in a passage connecting an air cleaner disposed above the engine and an engine combustion chamber, and a part of the air cleaner is disposed by being overlapped with the vehicle body frames in a shape in which upper surfaces thereof are narrowed inwardly, in a side view, an air cleaner main body having a shape in which an upper surface portion of a part overlapped with the vehicle body frames in the side view is narrower than a bottom surface portion of the part, and formed to have approximately uniform gaps along inner surfaces of the vehicle body frames, in which the air cleaner main body is inserted from a position below the vehicle body frames and is fixed to the vehicle body frames before mounting the engine.

Further, it is characterized in that in the air cleaner structure of the motorcycle of the present invention, an opening is provided on an upper portion of the air cleaner main body, an air cleaner upper cover mounted on the opening via a seal member is fastened to the cleaner main body to form the air cleaner, and a mating surface between the air cleaner main body and the air cleaner upper cover is arranged above the upper surfaces of the vehicle body frames in the side view.

Further, it is characterized in that in the air cleaner structure of the motorcycle of the present invention, the air cleaner main body is housed within the vehicle body frames in a top view of the vehicle body, and the air cleaner upper cover and a fastening part between the air cleaner upper cover and the air cleaner main body are disposed to project from the inner surfaces of the vehicle body frames in a top view of the vehicle body.

DETAILED DESCRIPTION OF THE PREFERRED EMBODIMENTS

Hereinafter, a preferred embodiment of an air cleaner structure of a motorcycle in the present invention will be described based on the drawings.

Figure 1:
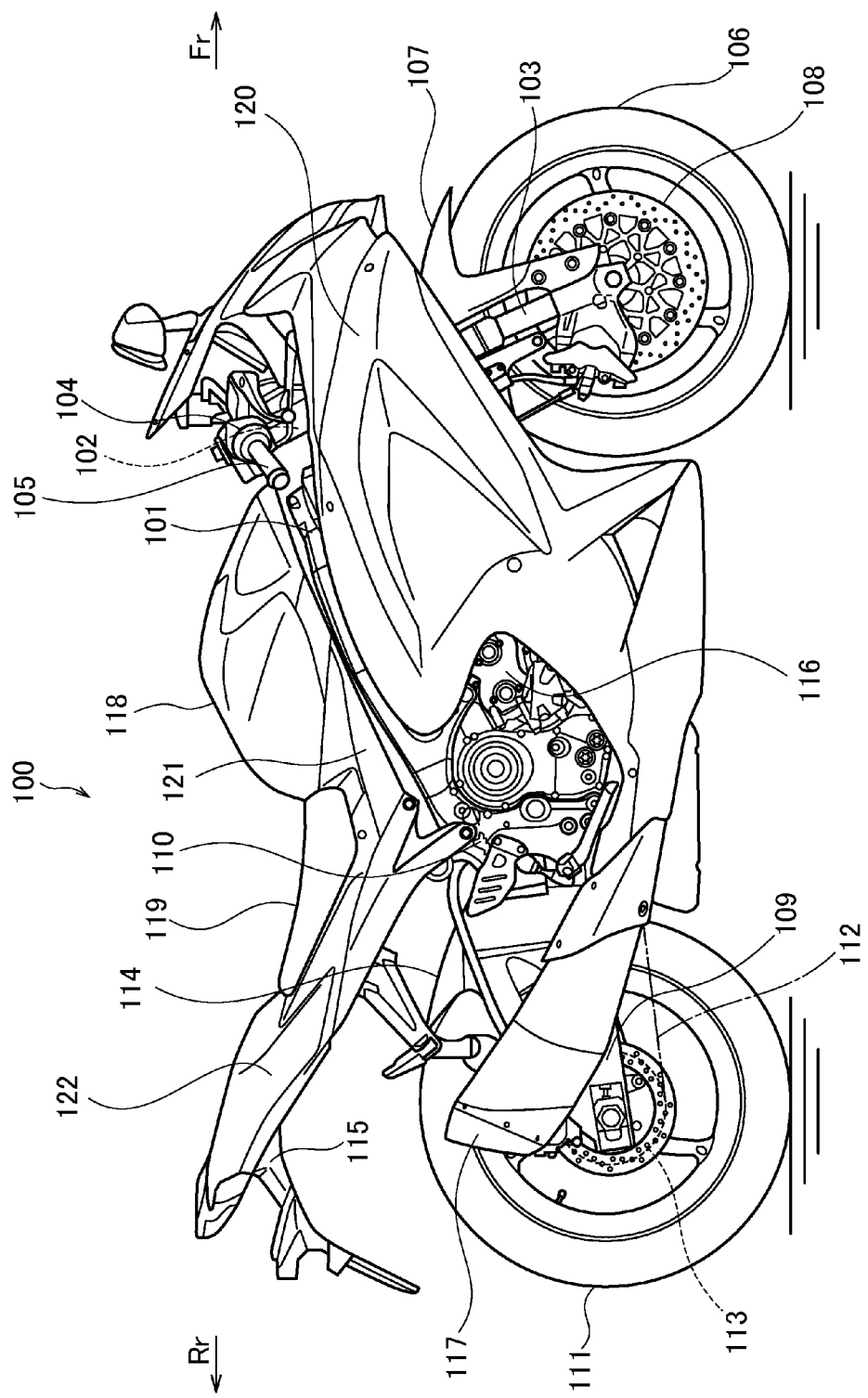
FIG. 1 is a side view of a motorcycle according to an embodiment of the present invention.

FIG. 1 is a side view of a motorcycle 100 as an application example of the present invention. At first, an entire configuration of the motorcycle 100 will be described by using FIG. 1. Note that in the drawings used in the following description including FIG. 1, a front side of a vehicle is represented by an arrow mark Fr, a rear side of the vehicle is represented by an arrow mark Rr, a lateral right side of the vehicle is represented by an arrow mark R, and a lateral left side of the vehicle is represented by an arrow mark L, respectively, according to need.

In FIG. 1, in a front part of vehicle body frames 101 (main frames) made of steel or aluminum alloy material, there are provided two right and left front forks 103 supported to be able to pivot in right and left directions by a steering head pipe 102. A handle bar 104 is fixed to upper ends of the front forks 103, and the handle bar 104 has grips 105 on both ends thereof. A front wheel 106 is rotatably supported by lower portions of the front forks 103, and a front fender 107 is fixed so as to cover a part above the front wheel 106. The front wheel 106 has a brake disk 108 which rotates integrally with the front wheel 106.

The vehicle body frames 101 are integrally coupled to a rear portion of the steering head pipe 102, the pair of right and left frames are branched into a two-pronged shape toward the rear direction, and extend rearward and downward from the steering head pipe 102 while enlarging a width thereof. In the present example, a so-called twin spar frame adopted as a suitable frame for a vehicle required to have a high-speed performance, is set to be employed. Incidentally, from a vicinity of rear portions of the vehicle body frames 101, a seat rail 101A extends rearward by being moderately inclined rearward and upward, to support a later-described seat. Further, swing arms 109 are coupled to the rear portions of the vehicle body frames 101 in a swingable manner, and a rear shock absorber 110 is laid between the swing arms 109. A rear wheel 111 is rotatably supported on rear ends of the swing arms 109. The rear wheel 111 is rotationally driven via a driven sprocket 113 around which a chain 112 that transmits motive power of a later-described engine is wound. It is possible that, in a periphery of a part which is very close to the rear wheel 111, there is provided an inner fender 114 covering a vicinity of a front part of and above the rear wheel 111, and a rear fender 115 is disposed at a position above the inner fender 114.

To an engine unit 116 mounted on the vehicle body frames 101, an air-fuel mixture formed of air and fuel supplied from not-illustrated air cleaner and fuel supply system respectively, is supplied, and an exhaust gas after combustion in the engine passes through an exhaust pipe to be exhausted from a muffler 117. A fuel tank is mounted at a position above the engine unit 116, and the fuel tank is covered by a tank cover 118. A seat 119 is continuously provided behind the fuel tank.

In an exterior of the vehicle, mainly a front part and side parts of the vehicle are covered by a fairing 120 and side cowls 121, a rear part of the vehicle is covered by side covers or a seat cowl 122, and by these exterior members, an appearance form of the vehicle, which has so-called streamlined shape, is formed.

Figure 2:
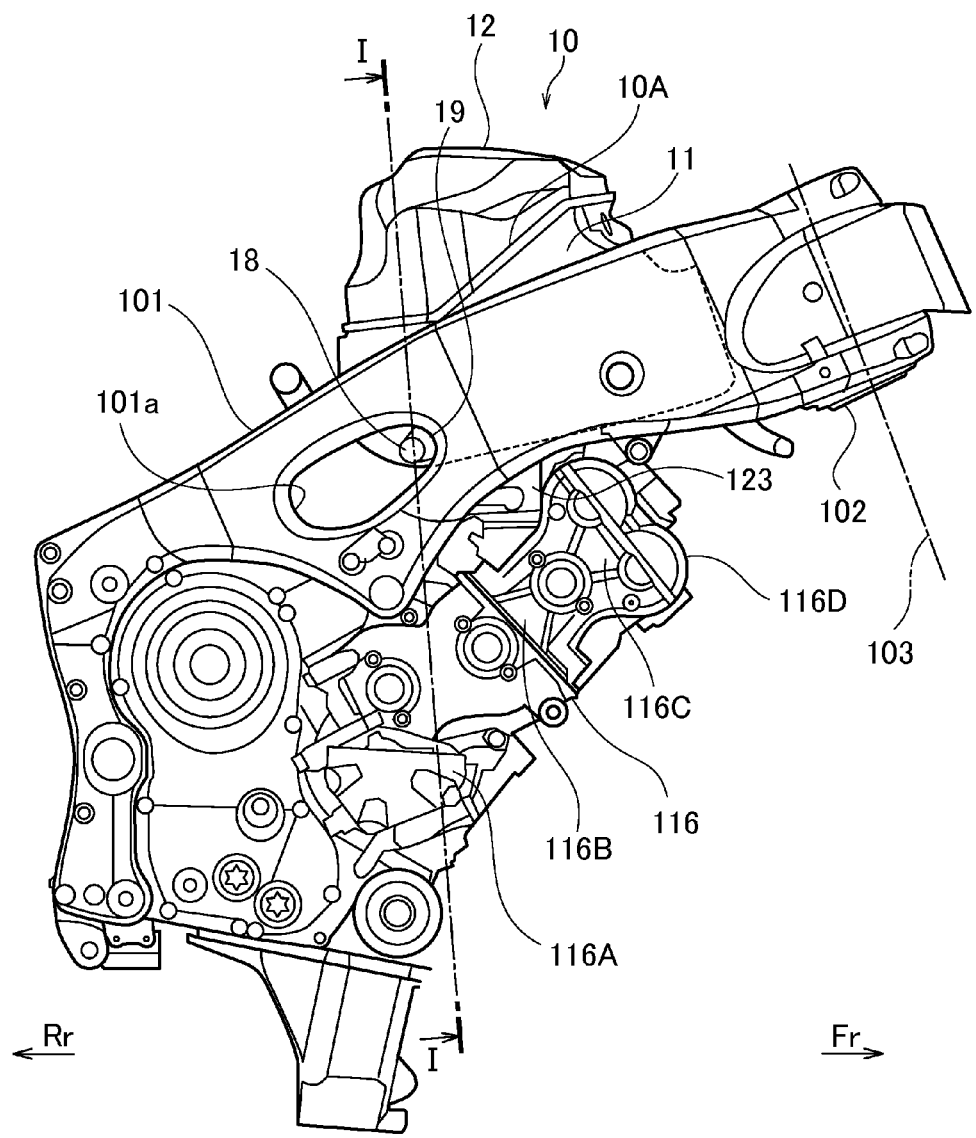
FIG. 2 in a side view illustrating a state in which an engine unit and an air cleaner are mounted on vehicle body frames in the embodiment of the present invention.

In the present embodiment, the engine of the engine unit 116 may be a four-cycle multicylinder engine, typically, a parallel four-cylinder engine, for example. Here, the engine unit 116 in this embodiment is formed in a manner that a cylinder block 116B, a cylinder head 116C and a cylinder head cover 116D are sequentially and integrally coupled on an upper part of a crankcase 116A, as illustrated in FIG. 2. Further, the engine unit 116 is suspended to the vehicle body frames 101 via a plurality of engine mounts to be integrally coupled to and supported by the vehicle body frames 101, and the engine unit 116 itself functions as a rigid member of the vehicle body frames 101.

Figure 3:
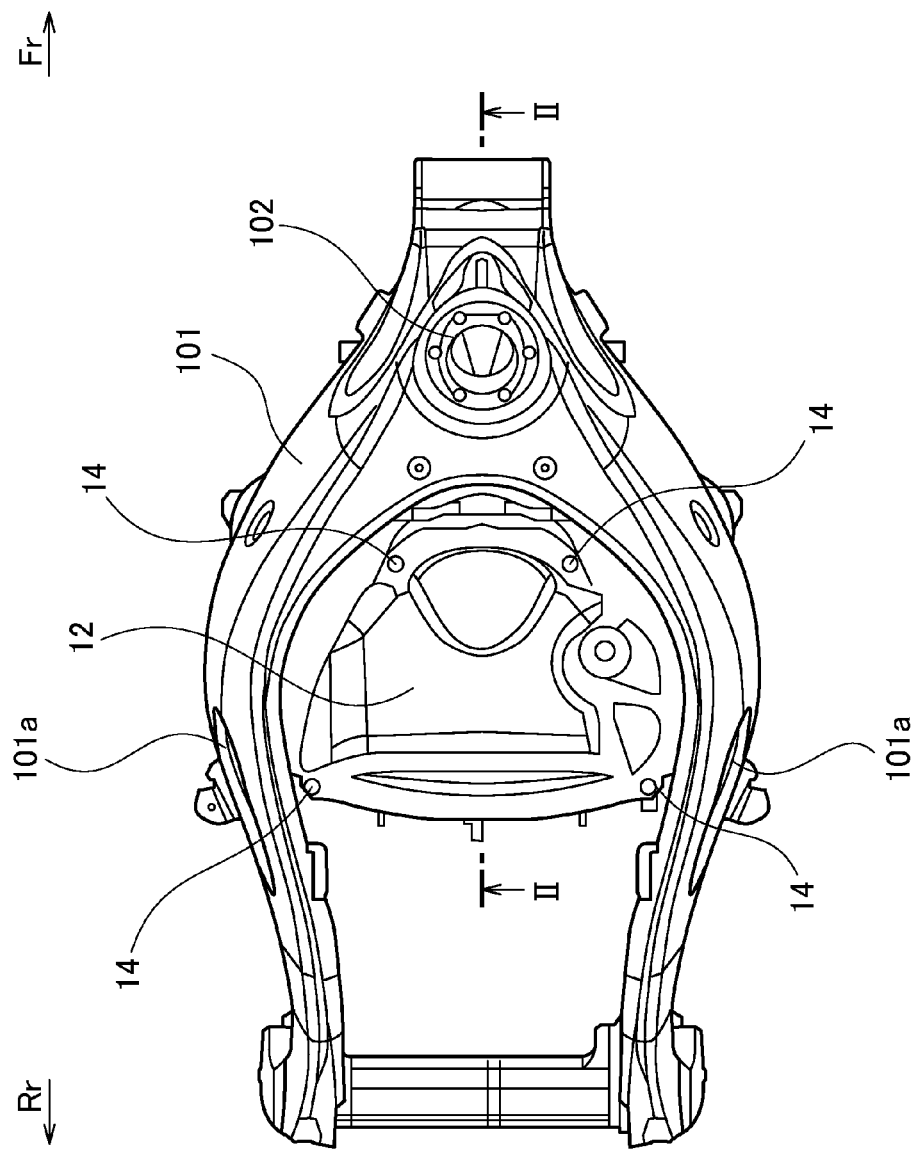
FIG. 3 is a top view illustrating a state in which the engine unit and the air cleaner are mounted on the vehicle body frames in the embodiment of the present invention.
Figure 4A:
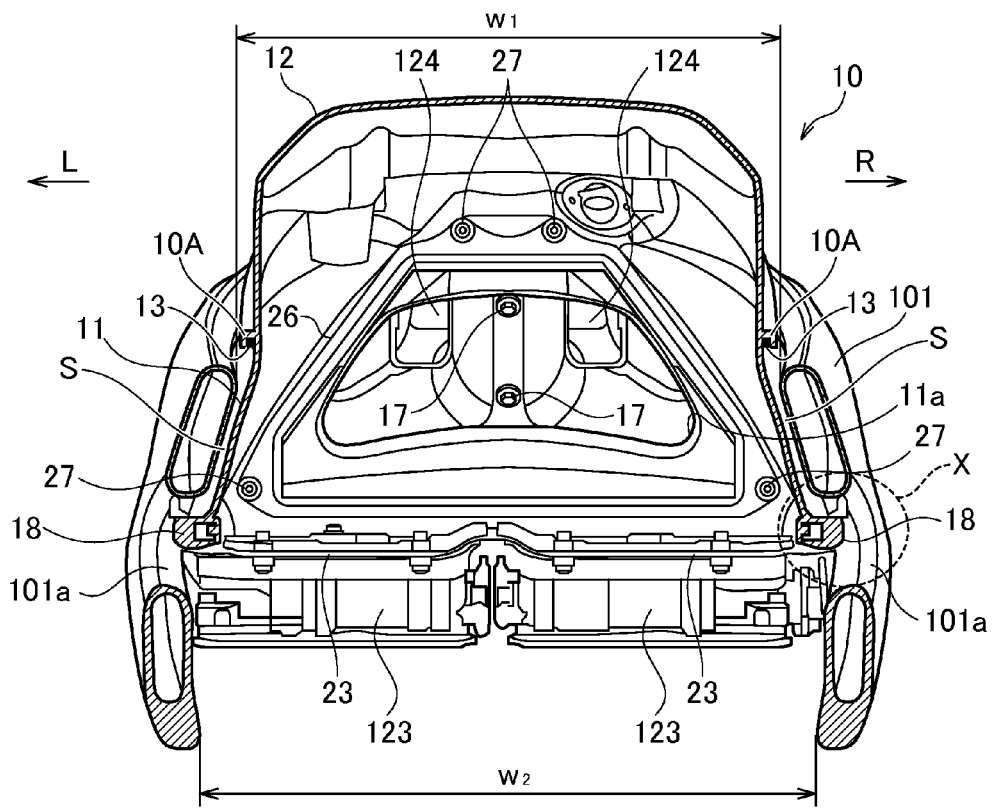
FIG. 4A in a sectional view taken along line I-I in FIG. 2.

In FIG. 2 and FIG. 3, the pair of right and left vehicle body frames 101 extend rearward and slightly downward from the steering head pipe 102. As illustrated in FIG. 3, a width between mutual right and left inner surfaces of the vehicle body frames 101 smoothly and gradually increases from the steering head pipe 102 to the rear direction, and there is provided an inner space or a space typically exhibiting an oval shape or a drop shape, if only partially. As illustrated in FIG. 2, the vehicle body frame 101 has a width in up and down directions which is approximately the same as a length in an axial direction of the steering head pipe 102. In this case, as illustrated in FIG. 4A, an upper surface side of the vehicle body frames 101 is formed to have a width narrower than a width of a lower surface side of the vehicle body frames 101, namely, the vehicle body frames 101 have an inverted V-shape in which the upper surfaces thereof are shaped to be narrowed inwardly. Specifically, an inner width $w_1$ on the upper surface side is set to be smaller than an inner width $w_2$ on the lower surface side.

Figure 5:
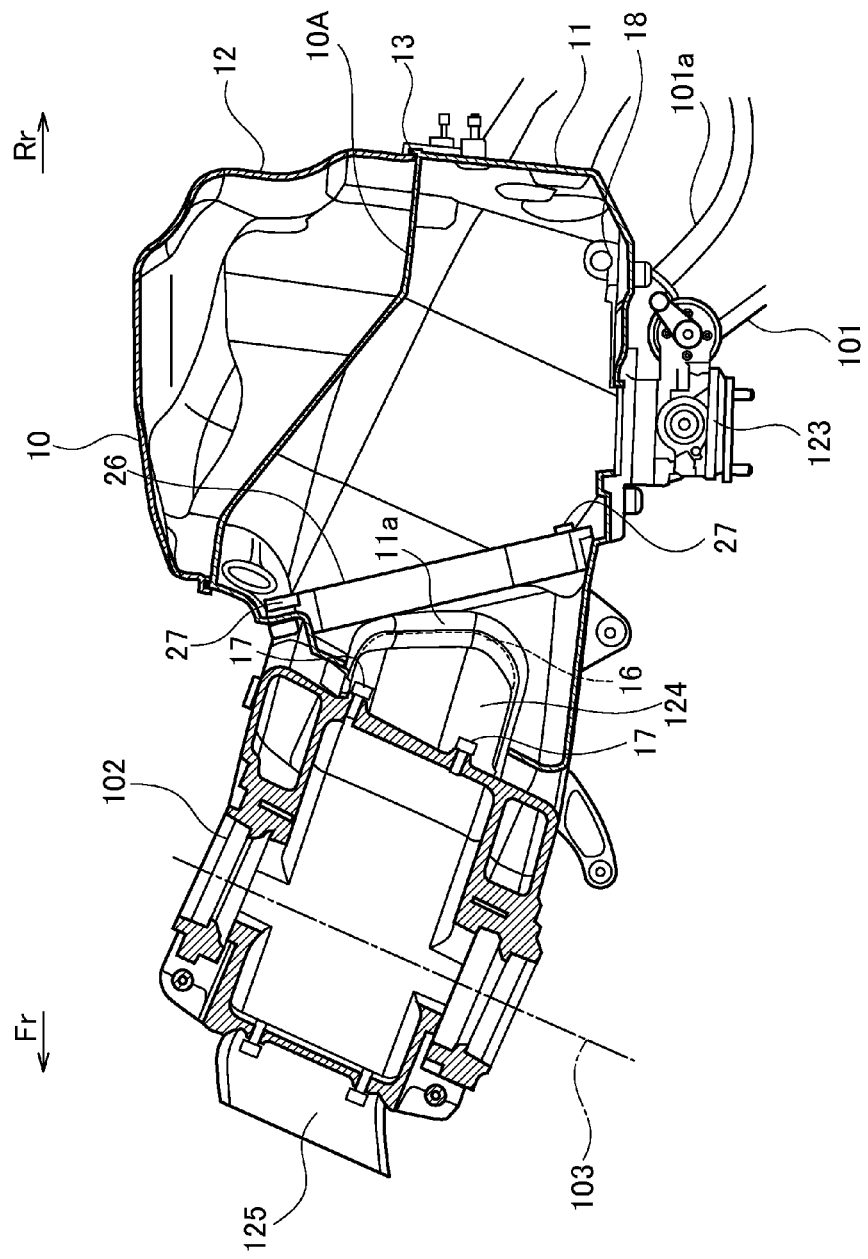
FIG. 5 is a sectional view taken along line II-II in FIG. 3.

In the inner space or the space formed between the right and left vehicle body frames 101 having a form as described above, an air cleaner 10 is housed and disposed, as illustrated in FIG. 4A. FIG. 5 and the like. The air cleaner 10 and the engine unit 116, particularly the cylinder head 116C, are connected by throttle bodies forming an intake device. Air cleaned by the air cleaner 10 is taken in by the intake device, and fuel is supplied from the fuel supply system, and accordingly, an air-fuel mixture with a predetermined mixture ratio is supplied to an intake port of the cylinder head 116C. As can be understood from FIG. 2 as well, the air cleaner 10 is positioned above the cylinder head 116C. In an intake passage connecting an engine combustion chamber which is communicated with the intake port and the air cleaner 10, throttle bodies 123 are disposed in a vertical posture in an approximately vertical direction as illustrated in FIG. 2 or FIG. 5, namely, in the present example, a downdraft type intake structure is employed.

Figure 6:
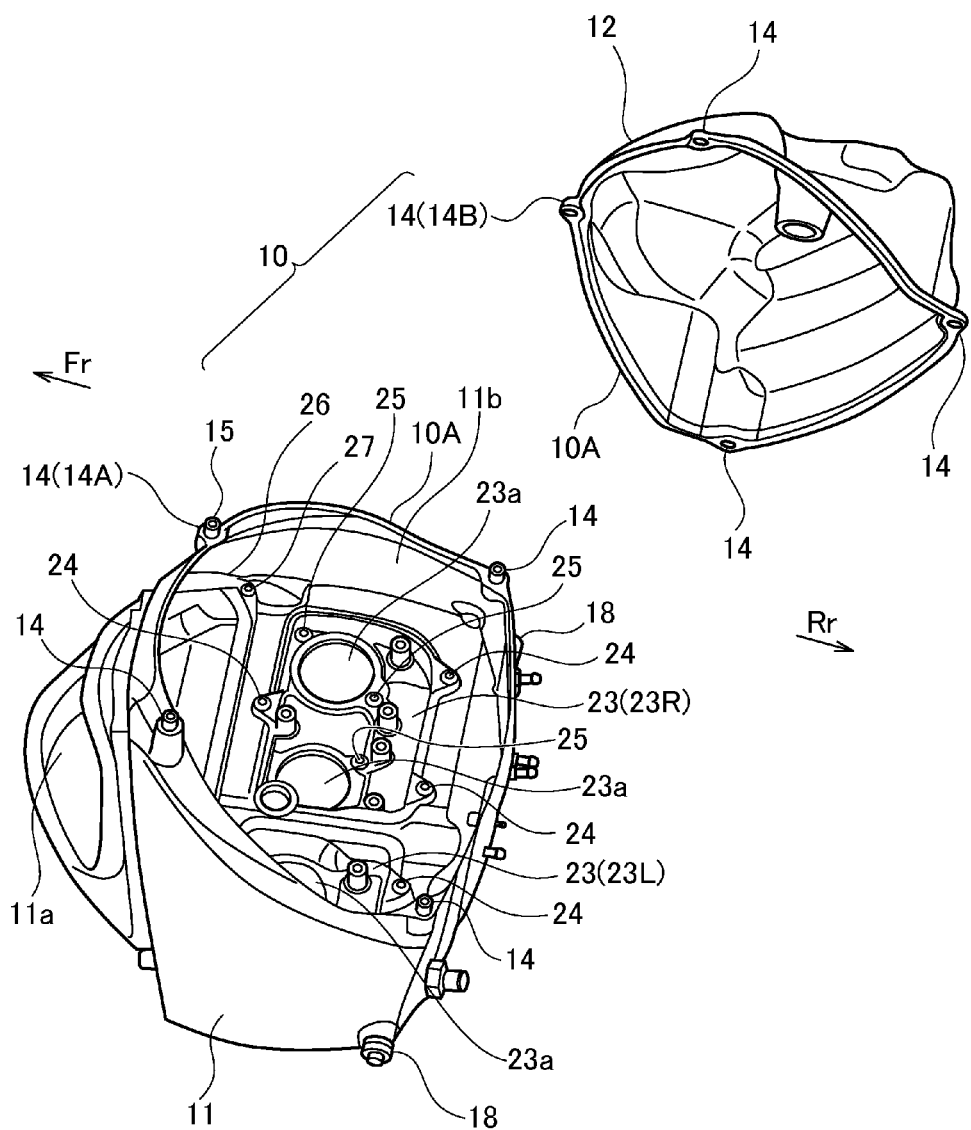
FIG. 6 is an exploded perspective view of the air cleaner when bottom plates and the like are attached, in the embodiment of the present invention.
Figure 7:
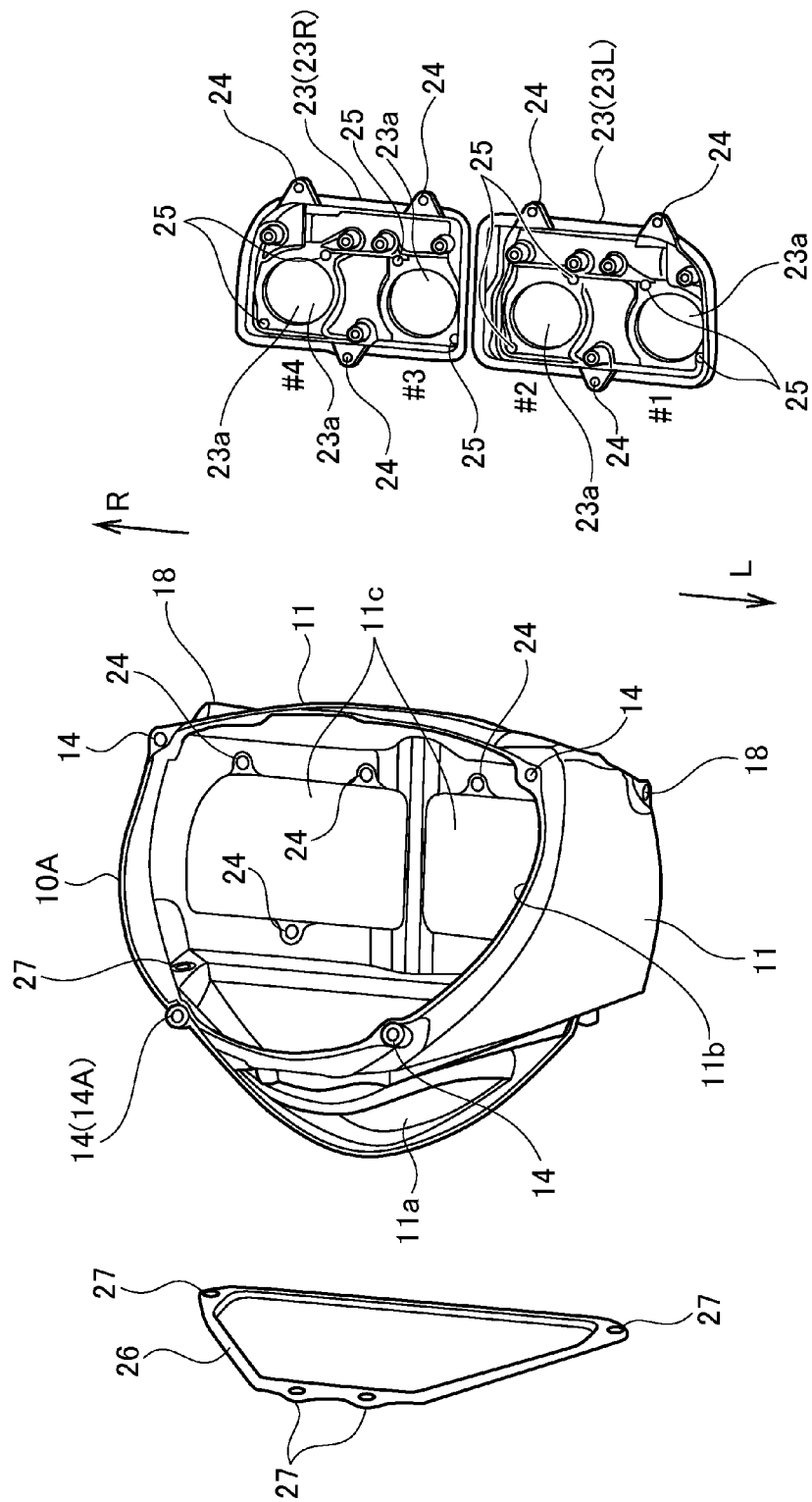
FIG. 7 is an exploded perspective view of the air cleaner when the bottom plates and the like are detached, in the embodiment of the present invention.

Here, FIG. 6 and FIG. 7 illustrate a concrete configuration example of the air cleaner 10 in the present embodiment. The air cleaner 10 is formed of an air cleaner main body 11 and an air cleaner upper cover 12 configured to be vertically divided into two parts, and the both are integrally coupled to exhibit a roughly deformed box shape. Openings 11a, 11b, and 11c are provided on a front surface an upper surface, and a bottom surface, respectively, of the air cleaner main body 11. A seal member 13 (FIG. 5) is attached to and the air cleaner upper cover 12 is mounted on the opening 11b of the upper surface of the air cleaner main body 11 out of the above openings, and by coupling the air cleaner main body 11 and the air cleaner upper cover 12 through bolt fastening, the opening 11b is closed. In this case, as illustrated in FIG. 6 and FIG. 7, there are provided a plurality of (four, in this case) fastening parts 14, in which the air cleaner main body 11 has fastening bosses 14A formed thereon and has screw portions into which bolts 15 are screwed. Further, on the air cleaner upper cover 12, fastening flange parts 14B are provided in a projecting manner, and openings through which the bolts 15 are inserted are provided to the fastening flange parts 14B. By fastening the four fastening parts 14, the air cleaner main body 11 and the air cleaner upper cover 12 are firmly coupled.

The opening 11a of the front surface of the air cleaner main body 11 is formed to be long in right and left directions as illustrated in FIG. 4A, and air is introduced into the opening 11a from intake ducts 124 illustrated in FIG. 4A, FIG. 5 and the like. As illustrated in FIG. 5, an intake port 125 which communicates with the intake ducts 124 is opened on a front part of the steering head pipe 102. The intake ducts 124 communicated with the intake port 125 are routed around from both right and left sides of the steering head pipe 102 and joined together at the rear part thereof, and connected to the opening 11a of the air cleaner main body 11. The opening 11a of the air cleaner main body 11 is inserted into the intake ducts 124 via rubber seals 16 as illustrated in FIG. 5, and fixed in a floating manner.

Figure 4B:
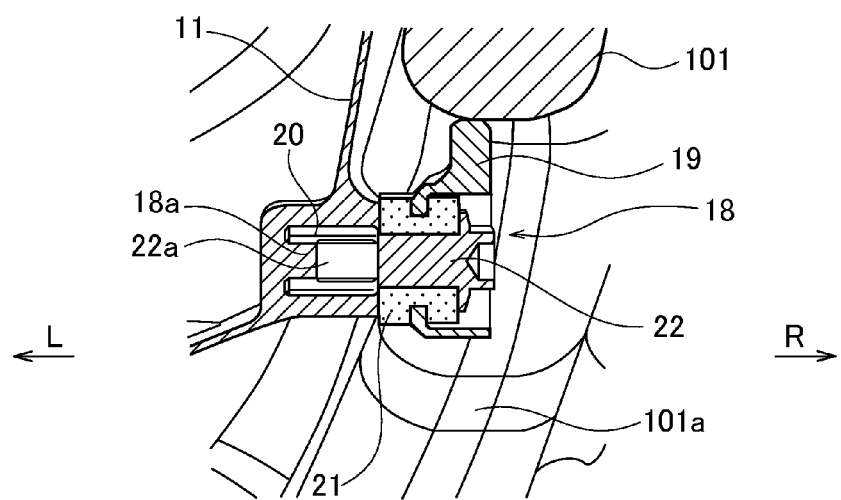
FIG. 4B is an enlarged sectional view of X part in FIG. 4A.

Further, as illustrated in FIG. 6 and the like, at corner portions in a downward direction in the vicinity of rear end of an outside surface of the air cleaner main body 11, a pair of right and left fastening parts 18 with respect to the vehicle body frames 101 are provided, and the air cleaner main body 11 is supported in a floating manner by fastening brackets 19 (refer to FIG. 2) provided to the vehicle body frames 101 in a projecting manner, at the respective fastening parts 18. More concretely, the fastening bracket 19 extends in a window part 101a formed on the vehicle body frame 101, and projects from the window part 101a in a side view, as illustrated in FIG. 2. FIG. 4B illustrates a detailed structure of the fastening part 18, in which an insert nut 20 is embedded in the fastening part 18. A cushion 21 is attached to the fastening bracket 19, and a fastening bolt 22 inserted into the cushion 21 is designed to be screwed into the insert nut 20. In this case, a screw portion 22a of the bolt 22 abuts on a seat 18a provided to the fastening part 18, and accordingly, it is designed such that the cushion 21 is fastened by a moderate amount of force, and the fastening part 18 is supported with no looseness.

As illustrated in FIG. 6 and FIG. 7, in the openings 11c of the bottom surface of the air cleaner main body 11, air cleaner bottom plates 23 are fastened to the air cleaner main body 11 via seal members. In the parallel four-cylinder engine of the present embodiment, #1 to #4 cylinders (which will be simply described as "#1" and the like, in the following explanation) are arranged, from the left, in the right and left directions (width direction) (refer to FIG. 8). A throttle body 123 is connected to each cylinder, and in the present example, the throttle bodies 123 are coupled to be unitized, via a bracket, in a combination of mutually adjacent throttle bodies. Specifically, four throttle bodies 123 are divided into two sets, being a set of #1 and #2, and a set of #3 and #4. There are provided two right and left openings 11c with respect to an air cleaner bottom plate 23L corresponding to #1 and #2, and an air cleaner bottom plate 23R corresponding to #3 and #4. Each of the air cleaner bottom minion 23 is fastened to the air cleaner main body 11 with the use of three fastening parts 24 in this example.

On each of the air cleaner bottom plates 23, passage holes 23a connecting the engine combustion chamber and the inside of the air cleaner main body 11 are formed, and the intake air is set to flow through the passage holes 23a. Each of the air cleaner bottom plates 23 is further fastened to the corresponding throttle body 123 by two fastening parts 25, in this example, provided in the vicinity of outer peripheral portion of the passage hole 23a for each throttle body 123. As illustrated in FIG. 4A and FIG. 5, the air cleaner main body 11 is coupled to upper end portions of the throttle bodies 123, but, the air cleaner bottom plates 23 are directly coupled to the throttle bodies 123, and the passage holes 23a are disposed by being aligned with intake passages of the throttle bodies 123.

Further, when referring to FIG. 6 and FIG. 7, at a position between the opening 11a of the front surface and the openings 11c of the bottom surface of the air cleaner main body 11, an air filter 26 is diagonally attached approximately toward a direction of the opening 11b of the upper surface. As illustrated in FIG. 4A and the like, the air filter 26 is formed in a cone shape, namely, a shape in which an upper part side is formed to have a narrow width, and in this example, the air filter 26 is fastened to the air cleaner main body 11 by four fastening parts 27.

In the above-described case, a not-illustrated fuel tank is mounted and supported on a rear side of the air cleaner 10 mounted on the vehicle body frames 101. The fuel tank and the air cleaner 10 are integrally covered as a whole, by the tank cover 118.

Incidentally, in the present invention, particularly a shape of a part overlapped with the vehicle body frames 101 in a side view of FIG. 2, namely, a shape of the air cleaner main body 11 disposed on the inside of the vehicle body frames 101 is a shape in which the upper surface portion is narrower than a bottom surface portion, as illustrated in FIG. 4A. In this case, approximately uniform gaps S are further formed along and between an outside surface of the air cleaner main body 11 and inner surfaces of the vehicle body frames 101. Further, the air cleaner upper cover 12 coupled to the opening 11b of the upper surface of the air cleaner main body 11 has a planar shape equal to or less than that of the opening 11b, as can be understood from FIG. 4A, FIG. 6 or the like. Specifically, the entire air cleaner 10 has a form of being fitted within the inner width in the right and left directions of the vehicle body frames 101.

Figure 8:
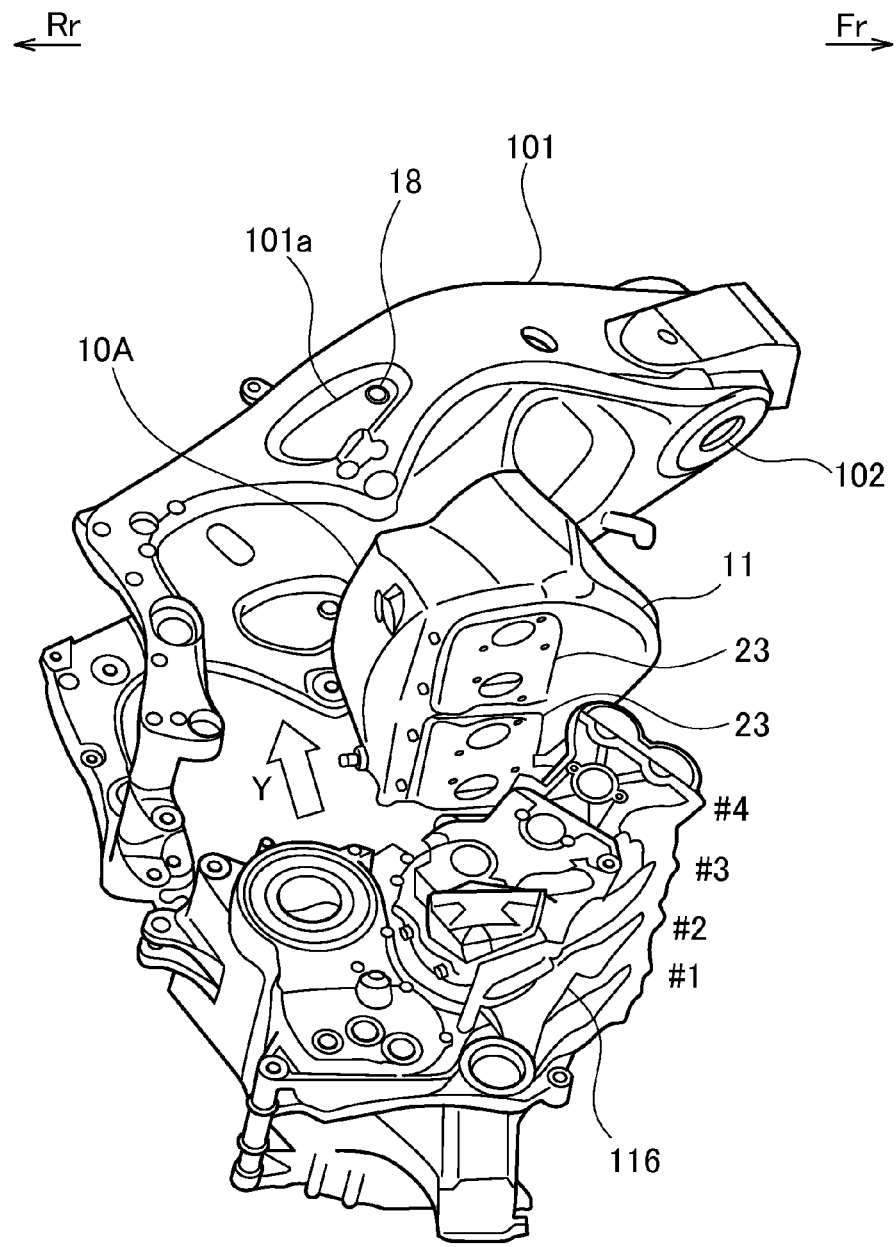
FIG. 8 is a perspective view illustrating an assembling step of the air cleaner and the like in the embodiment of the present invention.

Here, as illustrated in FIG. 8, when assembling the air cleaner 10 and the like, the air cleaner main body 11 is inserted from a position below (namely, from wide-width side of) the vehicle body frames 101 before mounting the engine unit 116 (arrow mark Y in FIG. 8), and is fixed to the vehicle body frames 101. Since it is set such that the air cleaner main body 11 has its upper surface side whose width is narrow, and the gaps S are secured between the air cleaner main body 11 and the inner surfaces of the vehicle body frames 101 as described above, the air cleaner main body 11 can be inserted and assembled, properly and with no difficulty, with respect to the vehicle body frames 101 being the twin spar frame.

By employing the twin spar frame, the frontal projected area of the vehicle becomes small, and the aerodynamic performance is improved. Further, by enlarging the degree of freedom when a rider rides the vehicle, riding characteristics are improved, and accordingly, it becomes possible to provide the motorcycle 100 having a parallel multicylinder engine with wide width mounted thereon while improving both of the aerodynamic performance and the riding characteristics.

Further, an adjustment of twisting of the vehicle body frames 101, and an adjustment of rigidity in a horizontal direction and a vertical direction, respectively, of the vehicle body frames 101 can be easily conducted based on characteristics (performance requirement) of the vehicle.

Further, regarding the air cleaner 10 configured to be vertically divided into two parts, the air cleaner upper cover 12 is mounted on the opening 11b of the upper surface of the air cleaner main body 11, and is fastened to the air cleaner main body 11 by bolts via the seal member. In the air cleaner 10 mounted on the vehicle body frames 101, a mating surface 10A between the air cleaner main body 11 and the air cleaner upper cover 12 is arranged above the upper surfaces of the vehicle body frames 101 in a side view, and is not overlapped with the vehicle body frames 101, as illustrated in FIG. 2. In this case, in a top view of the vehicle body, the air cleaner main body 11 is housed within the vehicle body frames 101, and the air cleaner upper cover 12 projects from the inner surfaces of the vehicle body frames 101, as illustrated in FIG. 3.

At the time of assembling, the air cleaner main body 11 is attached to the vehicle body frames 101, the air cleaner upper cover 12 is mounted so as to be put on the air cleaner main body 11 from above, and the air cleaner upper cover 12 is fixed by the bolts 15 at the fastening parts 14. Further, at the time of detaching the air cleaner upper cover 12, it is possible to access the bolts 15 from above. When performing a maintenance and the like, the maintenance and the like can be conducted only by removing the air cleaner upper cover 12, so that there is no need to attach/detach the air cleaner main body 11 to/from the vehicle body frames 101, resulting in that the maintenance work and the like can be easily and smoothly conducted. When accessing the bolts 15 for attaching/detaching the air cleaner upper cover 12, the mating surface 10A is positioned above the upper surfaces of the vehicle body frames 101, so that the vehicle body frames 101 themselves do not hinder the work, which contributes to the improvement of workability.

The present invention has been described above together with the various embodiments, but, the present invention is not limited only to these embodiments, and modifications and the like can be made within the scope or the present invention.

In the above-described embodiment, a multicylinder engine other than the four-cylinder engine can also be similarly applied to the engine unit 116.

According to the present invention, preferably, by fixing an air cleaner having a shape in which an upper surface portion thereof is narrower than a bottom surface portion thereof, to a twin spar frame in which upper surface portions of vehicle body frames are narrowed inwardly, before mounting an engine, it is possible to provide a vehicle having a parallel multicylinder engine mounted thereon, with improved aerodynamic characteristics and degree of freedom at a time of riding.

It should be noted that the above embodiments of the present invention merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. An air cleaner structure of a motorcycle comprising:
   vehicle body frames branched into right and left frames, in which an engine is mounted on, and extended diagonally rear downward from a steering head pipe, wherein the vehicle body frames have an upper surface side and a lower surface side;
   an inner width of the upper surface side of at least a portion of the vehicle body frames is formed to have a width narrower than at least a portion of an inner width of the lower surface side of the vehicle body frames; and
   an air cleaner disposed above the engine and connected to an engine combustion chamber using throttle bodies disposed in a vertical posture, wherein a part of the air cleaner is disposed by being overlapped with the vehicle body frames, in a side view, comprising:
      an air cleaner main body comprising, in the part overlapped with the vehicle body frames in the side view, a width of an upper surface portion of the overlapped part is narrower than a width of a bottom surface portion of the overlapped part in a vehicle width direction; and
      approximately uniform gaps formed along inner surfaces of the vehicle body frames,
      wherein the air cleaner main body is inserted from a position below the vehicle body frames and is fixed to the vehicle body frames before mounting the engine.

2. The air cleaner structure of the motorcycle according to claim 1, wherein: an opening is provided on an upper portion of the air cleaner main body, and an air cleaner upper cover mounted on the opening via a seal member is fastened to the air cleaner main body to form the air cleaner; and a mating surface between the air cleaner main body and the air cleaner upper cover is arranged above the upper surfaces of the vehicle body frames in the side view.

3. The air cleaner structure of the motorcycle according to claim 1, wherein the air cleaner main body is housed within the vehicle body frames in a top view of the vehicle body, and an air cleaner upper cover and a fastening part between the air cleaner upper cover and the air cleaner main body are disposed to project from the inner surfaces of the vehicle body frames in the top view of the vehicle body.

4. The air cleaner structure according to claim 1, further comprising:
   an opening provided on an upper portion of the air cleaner main body;
   an air cleaner upper cover mounted on the opening via a seal member and fastened to the air cleaner main body to form the air cleaner; and
   a mating surface between the air cleaner main body and the air cleaner upper cover arranged above the upper surfaces of the vehicle body frames in the side view.

5. The air cleaner structure of the motorcycle according to claim 2, wherein the air cleaner main body is housed within the vehicle body frames in a top view of the vehicle body, and the air cleaner upper cover and a fastening part between the air cleaner upper cover and the air cleaner main body are disposed to project from the inner surfaces of the vehicle body frames in the top view of the vehicle body.

6. An air cleaner structure of a motorcycle having vehicle body frames, to mount an engine, branched into right and left frames, and extended diagonally rear downward from a steering head pipe, wherein the vehicle body frames have an upper surface side and a lower surface side, and an inner width of the upper surface side of at least a portion of the vehicle body frames is formed to have a width narrower than at least a portion of an inner width of the lower surface side of the vehicle body frames, the air cleaner structure comprising:
   an air cleaner disposed above the engine and connected to an engine combustion chamber using throttle bodies disposed in a vertical posture,
   an overlapping portion overlapping the vehicle body frames, in a side view;
   an air cleaner main body comprising, in the overlapping portion, a width of an upper surface portion of the overlapping portion is narrower than a width of a bottom surface portion of the overlapping portion in a vehicle width direction; and
   approximately uniform gaps formed in the air cleaner body along inner surfaces of the vehicle body frames,
   wherein the air cleaner main body is inserted from a position below the vehicle body frames and is fixed to the vehicle body frames before mounting the engine.

7. The air cleaner structure according to claim 6, wherein the air cleaner main body is housed within the vehicle body frames in a top view of the vehicle body, and an air cleaner upper cover and a fastening part between the air cleaner upper cover and the air cleaner main body are disposed to project from the inner surfaces of the vehicle body frames in the top view of the vehicle body.

8. The air cleaner structure of the motorcycle according to claim 4, wherein the air cleaner main body is housed within the vehicle body frames in a top view of the vehicle body, and the air cleaner upper cover and a fastening part between the air cleaner upper cover and the air cleaner main body are disposed to project from the inner surfaces of the vehicle body frames in the top view of the vehicle body.

* * * * *